US009516466B2

(12) United States Patent
Ruhstaller et al.

(10) Patent No.: US 9,516,466 B2
(45) Date of Patent: Dec. 6, 2016

(54) ESTABLISHING PRESENCE BY IDENTIFYING AUDIO SAMPLE AND POSITION

(71) Applicant: Google Inc., Mountain View, CA (US)

(72) Inventors: Matthew Gray Ruhstaller, Oakland, CA (US); Brandon Bilinski, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/570,059

(22) Filed: Dec. 15, 2014

(65) Prior Publication Data
US 2016/0174036 A1    Jun. 16, 2016

(51) Int. Cl.
H04W 24/00    (2009.01)
H04W 4/02     (2009.01)
H04H 60/78    (2008.01)
H04H 60/58    (2008.01)
H04H 60/85    (2008.01)
H04H 60/37    (2008.01)
H04H 20/38    (2008.01)
H04H 60/51    (2008.01)
H04H 60/61    (2008.01)
H04H 60/65    (2008.01)

(52) U.S. Cl.
CPC ............. *H04W 4/023* (2013.01); *H04H 20/38* (2013.01); *H04H 60/37* (2013.01); *H04H 60/51* (2013.01); *H04H 60/58* (2013.01); *H04H 60/61* (2013.01); *H04H 60/65* (2013.01); *H04H 60/78* (2013.01); *H04H 60/85* (2013.01)

(58) Field of Classification Search
CPC ..................... G06F 3/0482; H04N 21/4825
USPC ... 455/344, 456.3, 414.1; 715/716; 709/204, 709/217, 203; 707/758
See application file for complete search history.

(56) References Cited

U.S. PATENT DOCUMENTS

| 7,013,301 | B2 | 3/2006 | Holm et al. |
| 7,706,838 | B2 | 4/2010 | Atsmon et al. |
| 8,078,136 | B2 | 12/2011 | Atsmon et al. |
| 2007/0169142 | A1 | 7/2007 | Claassen et al. |
| 2010/0281108 | A1* | 11/2010 | Cohen ............... G06F 17/30056 709/203 |
| 2012/0047156 | A1 | 2/2012 | Jarvinen et al. |
| 2013/0191454 | A1 | 7/2013 | Oliver et al. |
| 2014/0075308 | A1* | 3/2014 | Sanders ............... G11B 27/002 715/716 |
| 2014/0108441 | A1 | 4/2014 | Samari et al. |
| 2014/0115463 | A1 | 4/2014 | Reznor et al. |
| 2014/0168071 | A1 | 6/2014 | Ahmed et al. |

OTHER PUBLICATIONS

PCT/US2015/060142, International Search Report and Written Opinion issued in PCT/US2015/060142 on Jan. 21, 2016., 12.

* cited by examiner

*Primary Examiner* — Kiet Doan
(74) *Attorney, Agent, or Firm* — Morris & Kamlay LLP

(57) ABSTRACT

Systems and methods to capture, in a first device, a sample of audio data streaming from a server, transmit the sample to the server, and receive, in the first device, access to a secure service provided by the server when the server verifies that the first device is at a location of the audio based on the sample.

21 Claims, 3 Drawing Sheets

ESTABLISHING PRESENCE BY IDENTIFYING AUDIO SAMPLE AND POSITION

BACKGROUND

Systems to implement audio fingerprinting exist. Audio fingerprinting refers to capturing a brief sample of audio being played, creating an acoustic fingerprint based on the sample, and comparing the sample against a central database of known audio samples. Audio fingerprinting is presently used to identify songs.

BRIEF SUMMARY

According to an embodiment of the disclosed subject matter, a method may include capturing, in a first device, a sample of audio streaming from a server, transmitting the sample to the server, and receiving, in the first device, access to a secure service provided by the server when the server verifies that the first device is at a location of the audio based on the sample.

According to an embodiment of the disclosed subject matter, a system may include a server to stream data of a first audio sound and to receive a captured sample of the first audio sound. The server may be configured to compare the sample to one or more streaming data channels managed by the server and, based at least in part on the comparison, provide a first device which transmitted the sample with access to a secure service of the server.

According to an embodiment of the disclosed subject matter, means for capturing, in a first device, a sample of audio data streaming from a server, means for transmitting the sample to the server, and means for receiving, in the first device, access to a secure service provided by the server when the server verifies that the first device is at a location of the audio based on the sample are provided.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
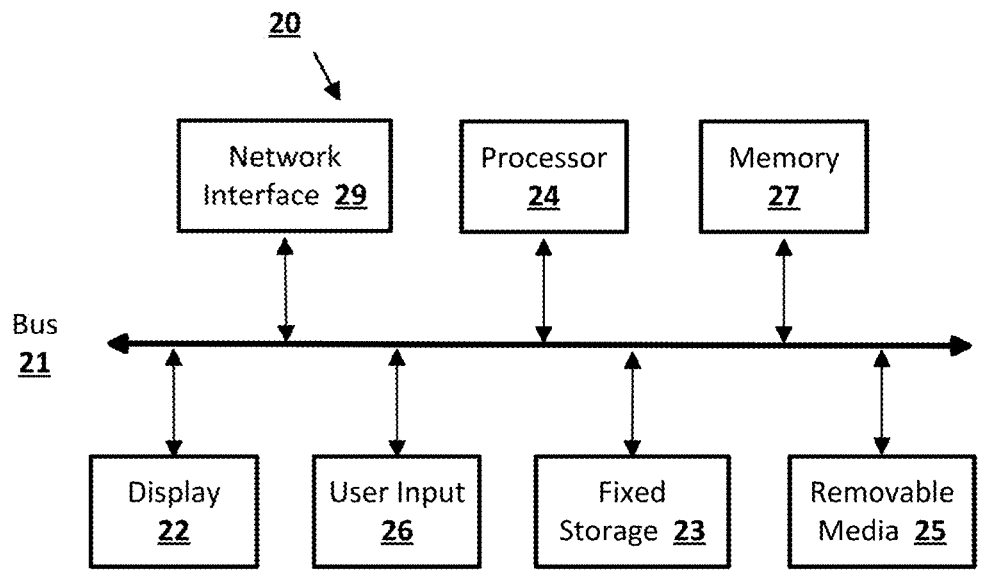
FIG. 1 shows a computing device according to an embodiment of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

A media distribution system may store a plurality of media files which are available to users of the system for download, viewing, listening, etc. The system may include one or more servers to provide data services and one or more databases storing information including media files and user data. User data may include, for example, user account data and history data.

A user of the system may have an individual account with the system. The system may provide various services to a user in accordance with permissions and rights associated with the user's account. For example, a user may have purchased or licensed a number of copyrighted works, such as songs or movies. The system may thereby provide the user with a "streaming" service through which the user may remotely listen to the songs or watch the movies which have been purchased or licensed with the user's account by receiving a stream of data from the system at a device of the user's choosing.

When the system streams media files to a user device, the server may track the data being streamed and may determine that the data stream was initiated by a specific user account, i.e., a host user. The present disclosure provides embodiments of a system which uses the host user account and data stream correspondence to determine co-presence of two or more users at a given location. When co-presence is established between a host user and a guest user, the system may provide various services to the guest user at the location, as will be discussed in the embodiments below.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. In this sense, a determination of co-presence of users does not strictly require a determination of physical location of the users. Thus, the user may have control over how information is collected about the user and used by a system as disclosed herein.

Embodiments of the presently disclosed subject matter may be implemented in and used with a variety of component and network architectures. FIG. 1 is an example computing device 20 suitable for implementing a server in embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the device 20 are generally stored on and accessed via a computer readable medium, such as a hard disk drive (e.g., fixed storage 23), an optical drive, floppy disk, or other storage medium.

The fixed storage 23 may be integral with the device 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the device 20 to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a device 20 such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
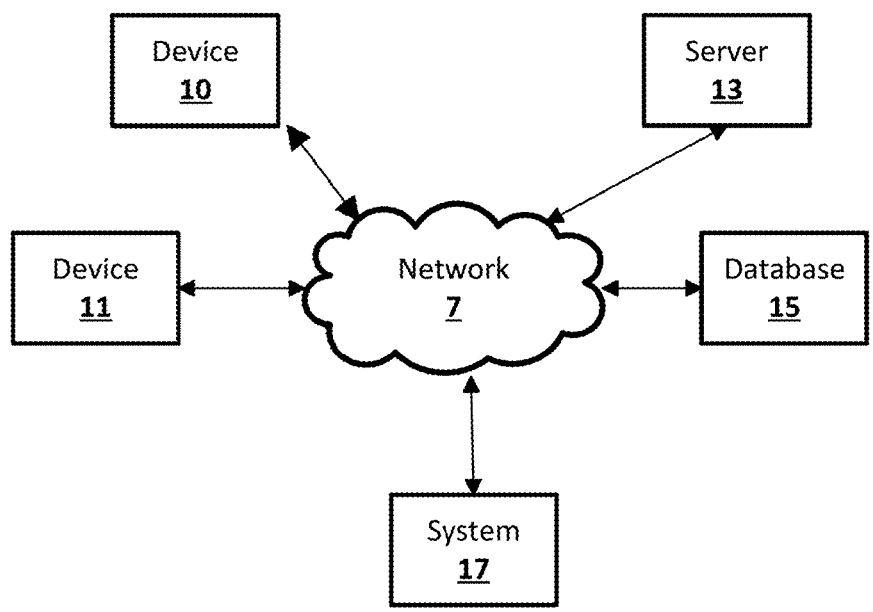
FIG. 2 shows a network configuration according to an embodiment of the disclosed subject matter.

FIG. 2 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described or a different type of computing device. The network may be a local network, wide-area network, the Internet, or any other suitable communication network or networks, and may be implemented on any suitable platform including wired and/or wireless networks. The devices 10, 11 may communicate with a system including one or more remote devices, such as servers 13 and/or databases 15. The remote devices may be directly accessible by the devices 10, 11, or one or more other devices may provide intermediary access such as where a server 13 provides access to resources, such as media files, stored in a database 15. The devices 10, 11 also may access system 17 or services provided by system 17 such as cloud computing arrangements and services. The system 17 may include one or more servers 13 and/or databases 15.

Figure 3:
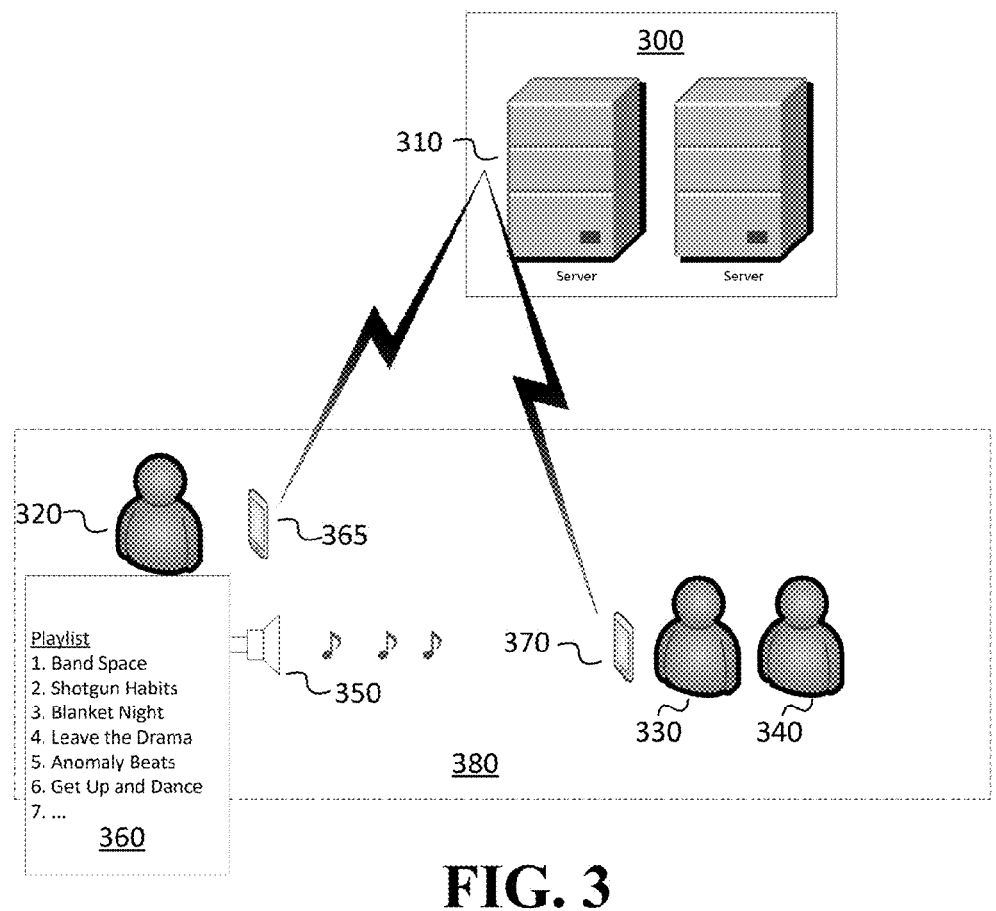
FIG. 3 shows an example application of a system according to an embodiment of the disclosed subject matter.

Referring now to FIG. 3, an embodiment of the disclosed subject matter will be described in reference to an example application relating to music media files. It should be understood that this example is not limiting and is merely presented to better facilitate explanation of the disclosed subject matter. The disclosed subject matter may be implemented in other ways, using other types of media files that include an audio component, for example, movies, audio books, lectures, etc.

An example system 300 may include one or more servers 310 which store music media files, user account data, and use history data. In this example, host user 320, e.g., "Lauren" may have a user account with the system 300. With the user account, Lauren may have purchased or licensed a number of songs through the system and may maintain a library of songs associated with her account. The system 300 may provide Lauren with various services related to her library of songs. For example, the system 300 may provide an interface and functionality by which Lauren may create playlists and stream songs to a device of her choice in a designated order from the one or more servers 310.

In FIG. 3, Lauren has invited two friends, guest user 330, e.g., "Grayson", and guest user 340, e.g., "Everly", to her home 380. When Grayson and Everly arrive, Lauren streams music from the system 300 and plays the music through speakers 350 in her home 380, with the order of songs being based on a playlist 360 she created utilizing the services provided by the system 300. For example, Lauren may have an application on a host user device, e.g., her phone 365, which she uses to log in to the system 300 and to select songs to add to the playlist 360. The songs therefore stream and play according to the order and selection of Lauren's playlist.

The system 300 includes a processor and instructions configured to operate the system 300 to manage user accounts, user libraries and user playlist services in a secure manner. For example, the system 300 may require Lauren to enter a user name and password in order for Lauren to receive access to her account information, library, playlists, and the like. Lauren may enter security credentials through a device of her choosing, for example, her phone 365. Thus, neither Grayson nor Everly can independently view or adjust Lauren's playlist immediately upon their arrival at the location 380 unless they know Lauren's security information or use Lauren's phone 365. Depending upon the circumstances, Grayson and Everly may confront significant inconveniences if either of them wishes to modify the contents or order of music playing at the location 380, such as to share music different from that selected by Lauren.

For example, Lauren may have left her phone 365 elsewhere in the house, may have otherwise created the playlist 360 with a host user device which is presently not accessible, or Lauren herself may be inaccessible if the occasion is a party in which she is busy attending to hosting duties. Distributing Lauren's security information among multiple parties would introduce a severe security risk. However, conventional media distribution systems provide no means for other users to access content purchased by one another, thus resulting in such insecure sharing of credentials in such situations. Even in the event that both Lauren and her phone 365 are accessible, it may not be convenient to pass Lauren's phone 365 around to multiple parties for the purpose of viewing and/or editing the playlist 360.

The system 300 of the present disclosure includes features which address these and other problems. Upon arrival at the location 380 where Lauren is playing the songs from her playlist 360, Grayson may use his own guest user device 370, e.g., phone 370, to capture a sample of the audio playing, e.g., song #6, "Get Up and Dance." Accordingly, Grayson may transmit the captured sample to the system 300. The transmission may include identification data which identifies Grayson's guest user device 370. Furthermore, the transmitted sample may be captured in any suitable form, for example, as a continuous transmission sample or a sample segment of audio data with a timestamp indicating a time when the sample was captured.

Figure 4:
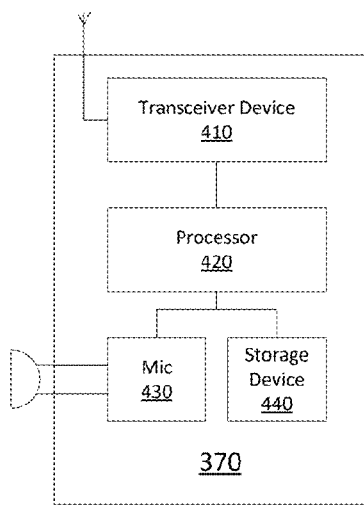
FIG. 4 shows an example guest user device according to an embodiment of the disclosed subject matter.

Referring to FIG. 4, guest user device 370 may generally be a device which includes a microphone 430 or similar component to capture audio, a storage device 440 to store captured audio, a transmission device such as a transmitter or a transceiver 410 to transmit audio samples, timestamp data, and other data, and to receive data from the server 310. The capturing and transmission functions of guest user device 370 may be implemented using hardware and/or software components. For example, guest user device 370 may include a processor 420 which executes instructions stored in the storage device 440 and operates the microphone 430, storage device 440 and transceiver 410 to capture and transmit audio samples. It should be understood that guest user device 370 may include additional components not mentioned here, as only components required for understanding the invention are described. For example and without limitation, guest user device 370 may be implemented as a mobile phone and include a display screen, or as a laptop computer and include a keyboard.

Referring back to FIG. 3, the system 300 may receive the transmission from the guest user device 370 and compare the received sample against one or more currently streaming audio channels managed by the system 300. Based on the comparison, the system 300 may find a matching stream for the sample and determine that Grayson is present at the location 380 currently streaming the matching song. For example, the system may use audio fingerprinting to identify a track in the one or more active audio stream channels managed by the system 300 and a position in the identified track as matching the sample. The system may determine, for example based on audio fingerprinting, that the sample is equivalent to a specific location in a specific stream.

Alternatively, the system may use audio fingerprinting to identify the sample with as being a portion of the song "Get Up and Dance." Having identified the sample, the system 300 may execute a search for instances of "Get Up and Dance" streaming and find an instance associated with Lauren's user account and presently streaming in sync with the timing of the sample. Accordingly, the system 300 may determine that the Grayson is a guest user 330 co-present with host user 320 Lauren at the location 380.

Based on the determination of co-presence, the system 300 may execute any of several optional actions. Therefore, generally, server 310 of the system 300 may be configured to receive the sample and compare the sample to one or more streaming data channels managed by the server 310 and, based at least in part on the comparison, provide the first device with access to a secure service of the server 310. The guest user device 370 may, upon receiving a notification from the server 310, provide the guest user with access to the secure service of the server 310 based on the server 310 processing the transmitted sample of captured audio For example, in an embodiment, the system 300 may automatically grant the ability to access various song queue or playlist management functions that otherwise may not be accessible to users other than Lauren, i.e., other than the host user. A playlist management function may be, without limitation, the system granting Grayson the ability to view Lauren's playlist 360. If Lauren is streaming songs based on a song queue instead of a playlist, a song queue management function may be, without limitation, the system granting Grayson the ability to add one or more songs or albums to the song queue.

In another embodiment, the system 300 may transmit an alert to Lauren or transmit an access approval request to her device 365. Lauren may accordingly deny or approve the request. Upon approval, the system 300 may allow Grayson further privileges, e.g., to add songs, delete songs or rearrange song order in Lauren's playlist 360. More generally, systems and techniques as disclosed herein may provide any suitable song queue or playlist management service or functionality to a guest user that is determined to be co-present with a host user with any additional restrictions or limitations imposed by the host user, as disclosed herein.

An embodiment of the system 300 may be configured to provide functions in which user account data may include personal designations of other users or classes of users. In this embodiment, Lauren may preapprove the system 300 providing certain services according to categorical designations. For example, using an account setting Lauren may inform the system 300 that any guest user whom she has assigned a certain designation (e.g., "friends" or "family") and is co-present with Lauren may view or edit a playlist associated with Lauren's account which contains a song that is presently streaming and used by the system 300 to establish co-presence. Such user categories designations may be predefined and/or defined by the user, and assignments of particular contacts to categories may be selected by the user, or may be determined based on another data source. For example, user associations within a social network or similar service may be used to determine to which group or groups each of a user's known associates may belong. As a specific example, a host user may be provided an opportunity to import contacts, groups, and the like from an existing social network, and/or to assign various permissions as disclosed herein to those groups and/or contacts. Furthermore, default permissions and/or limitations may be assigned to previously unknown guest users.

The management function provided to the host user by the system may include other control functions. For example, the host user may adjust or revoke permissions from a guest user or category of guest users at any time. The host use may optionally set a pre-determined time period for which the permission is valid or a cut-off time at which permissions automatically terminate. In this manner the host user may, for example, allow all guest users arriving at a party to add songs to a song queue up until 11:00, when the party ends.

While attempting to determine co-presence based on a received sample, the system 300 may encounter a situation in which multiple channels are streaming identical media files which match the sample. For example, a plurality of user accounts of the system 300 may be playing the same, extremely popular song. In order to de-dupe multiple synchronized streams, the server 310 may send a message to the host user device 365 and/or guest user device 370 requesting information identifying a secondary source to validate which of the channels is the correct channel matching the received audio sample. The secondary source may be, for example, a satellite navigation system such as global positioning system (GPS), local area network information such as WiFi network information, a device configured to communicate using near-field communication or short-wavelength radio waves, such as Bluetooth®, or other secondary sources. Upon receiving data regarding the secondary source, the system 300 may determine which of the plurality of user accounts streaming the matching media file is associated with the stream that is the source of the received sample.

The system 300 may use the secondary data source to verify the correct host user in any number of ways depending upon the availability of the data. For example, the secondary source data may be used to verify that a host user device 365 and guest user device 370 are on the same WiFi network, within the same physical GPS location, or in communication with the same Bluetooth device.

In another embodiment, to de-dupe multiple synchronized streams the server 310 may introduce a momentary delay in one or more candidate streams to identify which stream corresponds to the received sample. Such a delay may be relatively short, for example, such that it does not substantially interrupt user enjoyment of the audio stream, or such that it is too short to be generally audible. Similarly, a non-audible modification may be made to the audio stream, such as where a sound above or below the normal range of human hearing is added to the audio stream at a known point.

Further to the scenario of FIG. 3, more than one guest user (330, 340) may establish co-presence at a location 380 with a host user. The system 300 may therefore provide services to multiple guest users who have established co-presence. In this case, the provided services may be linked to the identity of each guest user respectively, e.g., certain services granted to guest users of one category may be denied to guest uses of a different category. For example, a service granted to one guest user present may include access to data, e.g., viewing information indicating a media file currently playing or a playlist/queue of media files, while a service granted to a different guest user present at the same occasion may be of a higher level, to modify data, e.g., to change the constitution or order of a playlist or to add songs to a queue. That is, one guest user may be provided the ability to view a playlist, while another guest user, or the same guest user, may be provided the ability to view and edit the playlist.

The services are not limited to those discussed above. The system 300 may execute any service based on a determination of co-presence. For example, a service provided to the host user and guest users may include a receipt and recordation of data. In this example, one or more guest users arriving at an event may establish co-presence with the host user. An application running on the server may automatically track the guest users which establish co-presence as a check-in service that indicates a guest user is present at the location. The server may maintain a list of checked-in guest users for the host user to review, or maintain a running total count of guest users who have established co-presence. In this example, the system 300 may automatically check-in guest users and keep a headcount without the host user needing to intervene or directly attend to the task.

One or more functions of the system 300 may be implemented in either the user devices (e.g., 365, 370 in FIG. 3) or in the server 310 of the system 300. For example, the system 300 may be implemented in a peer-to-peer embodiment in which the host user device 365 and the one or more guest user devices 370 communicate directly with each other to establish co-presence. In this embodiment, the server function may be implemented in the host user device 365.

Figure 5:
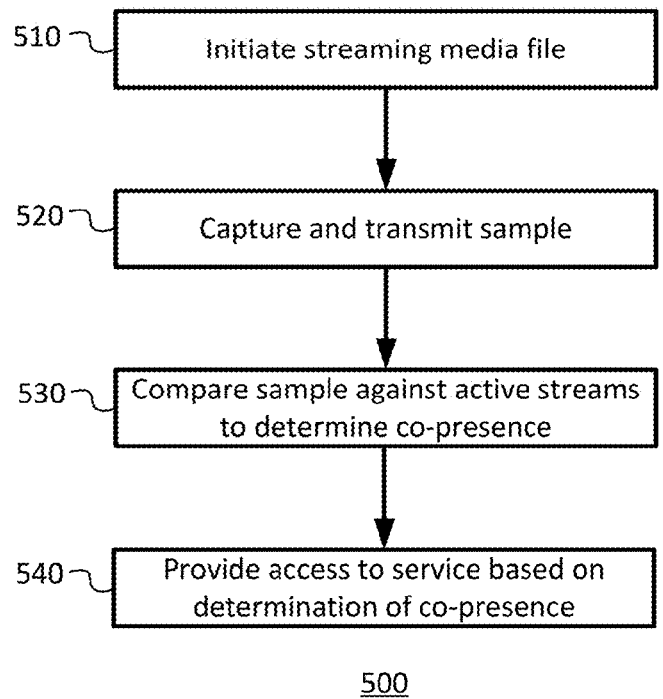
FIG. 5 is a flowchart according to an embodiment of the disclosed subject matter.

FIG. 5 shows a flowchart 500 of an example embodiment according to the present disclosure. At operation 510, a host user initiates playback of a media file streaming from a server. Generally, playback of a media file includes playing the media such that the audio and/or video can be heard and/or viewed by one or more users. At operation 520, a guest user captures a sample of the audio and transmits the sample to the server. The sample may include additional data along with the audio sample data, including, for example, guest user identification data and/or time of capture data. The sample may be a continuous sample that is transmitted until a match is found.

At operation 530, the server compares the sample against active streams to search for a match. The server may identify the media file using audio fingerprinting and search for presently streaming instances of the media file. The server may execute one or more measures to de-dupe the results if the search produces multiple matching instances. Once a match is found, the server determines that the guest user is co-present with the host user who initiated the stream. At operation 540, the server provides the guest user with access to a service based on the determination of co-presence. The service may be, for example, a check-in service, viewing a playlist, viewing a queue, editing a playlist, adding media files to a queue, or other services. The service may be based on a status of the guest user, for example, a designation or title assigned to the guest user or to categories of guest users by the host user.

Although illustrative examples provided herein are described in terms of audio playback, it will be understood that such audio may be part of an audiovisual or other combined work, such as a short film, movie, presentation, or the like. Such a media stream may be used as described herein using appropriate fingerprinting or other identification techniques without departing from the scope of the present disclosure.

Figure 6:
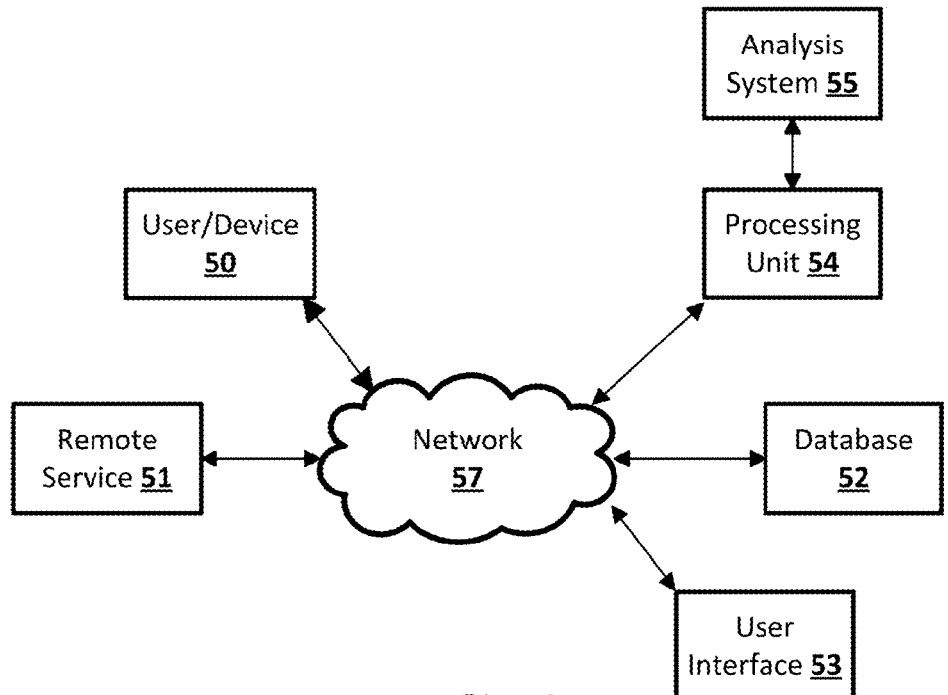
FIG. 6 shows an example network and system configuration according to an embodiment of the disclosed subject matter

FIG. 6 shows an example arrangement according to an embodiment of the disclosed subject matter. One or more user devices or systems 50, 51, such as local computers, smart phones, tablet computing devices, and the like, may connect to other devices via one or more networks 57. The network may be a local network, wide-area network, the Internet, or any other suitable communication network or networks, and may be implemented on any suitable platform including wired and/or wireless networks. The devices 50, 51 may communicate with the disclosed system as described above, implemented as one or more remote computer systems, such as processing units 54, databases 52, and user interface systems 53. In some cases, the devices 50, 51 may communicate with a user-facing interface system 53, which may provide access to one or more other systems such as a database 52, a processing unit 54, or the like. For example, the user interface 53 may be a user-accessible web page that provides data from one or more other computer systems. The user interface 53 may provide different interfaces to different clients, such as where a human-readable web page is provided to a web browser client on a user device 50, 51.

The user interface 53, database 52, and/or processing units 54 may be part of an integral system, or may include multiple computer systems communicating via a private network, the Internet, or any other suitable network. One or more processing units 54 may be, for example, part of a distributed system such as a cloud-based computing system, search engine, content delivery system, or the like, which may also include or communicate with a database 52 and/or user interface 53. In some arrangements, an analysis system 55 may provide back-end processing, such as where stored or acquired data is pre-processed by the analysis system 55 before delivery to the processing unit 54, database 52, and/or user interface 53. For example, a machine learning system 55 may provide various prediction models, data analysis, or the like to one or more other systems 52, 53, 54.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
    capturing, by a first device, a sample of audio streaming from a server, the audio comprising a song stored on the server;
    transmitting the sample to the server; and
    receiving, by the first device, access to a secure service provided by the server when the server verifies that the first device is at a location where the audio is being broadcast based on the sample, the secure service being a playlist management function for a playlist, and the access to the playlist management function including an ability to edit the playlist.

2. The method of claim 1, wherein the server compares the sample to one or more audio stream channels managed by the server to determine whether the first device is present at the location of the audio.

3. The method of claim 2, wherein the server uses audio fingerprinting to identify a track in the one or more audio stream channels and a position in the identified track as matching the sample.

4. The method of claim 1, wherein the access to the playlist management function is automatically terminated after a pre-determined time period.

5. The method of claim 1, wherein the secure service is a check-in service that indicates the first device is present at the location.

6. The method of claim 1, further comprising using a secondary data source to determine that the first device is present at the location of the audio.

7. The method of claim 6, wherein the secondary data source is one selected from the group consisting of: a satellite positioning system, a local area wireless network, a device configured to communicate using short-wavelength radio waves, and a device configured to communicate using near-field communication.

8. The method of claim 1, wherein transmitting the sample includes transmitting identification data identifying the first device.

9. The method of claim 1, wherein transmitting the sample includes transmitting timestamp data of when the sample was captured.

10. A system, comprising:
    a server to stream data of a first audio sound and to receive a captured sample of the first audio sound from a first device, the first audio sound being a song stored on the server;
    wherein the server is configured to compare the sample to one or more streaming data channels managed by the server and, based at least in part on the comparison, provide the first device with access to a secure service of the server, the secure service being a playlist management service for a playlist, and the access to the playlist management service including an ability to edit the playlist.

11. The system of claim 10, wherein the secure service is a check-in service to account the first device as present at the location.

12. The system of claim 10, wherein the server is further configured to provide the first device with access to the secure service when the server determines that the first device is at a location at which the first audio is played.

13. The system of claim 12, wherein the server compares the sample to one or more active audio stream channels managed by the server to determine whether the first device is present at the location of the audio.

14. The system of claim 12, further comprising using a secondary data source to verify that the first device is present at the location of the audio.

15. The system of claim 10, wherein the sample includes identification data identifying the first device.

16. The system of claim 10, wherein the sample includes timestamp data of when the sample was captured.

17. A method, comprising:
- streaming audio data to a device from a server, the audio data comprising a song stored on the server;
- receiving, at the server, a sample of the streaming audio data;
- comparing the received sample to one or more streaming data channels managed by the server; and
- providing access to a secure service of the server based at least in part on the comparison, the secure service being a playlist management service for a playlist, and the access to the playlist management service including an ability to edit the playlist.

18. The method of claim 17, wherein the sample includes identification data identifying a first device which sent the sample.

19. A mobile device, comprising:
- a microphone to capture audio, the audio comprising a song;
- a storage device to store captured audio; and
- a transceiver to transmit a sample of captured audio to a server and to receive data from the server,
- wherein the mobile device is configured to, upon receiving a notification from the server, provide access to a secure service of the server based on the server processing the transmitted sample of captured audio, the secure service being a playlist management function for a playlist, and the access to the playlist management function including the ability to edit the playlist.

20. The mobile device of claim 19, wherein the transceiver is further configured to transmit identification data identifying the mobile device.

21. The mobile device of claim 19, wherein the transceiver is further configured to transmit timestamp data of when the sample was captured.

* * * * *